United States Patent
Cobb, Jr. et al.

(10) Patent No.: US 9,767,009 B2
(45) Date of Patent: Sep. 19, 2017

(54) ADAPTATION OF AUTOMATED TEST SCRIPTS

(71) Applicant: International Business Machines Corporation, Armonk, NY (US)

(72) Inventors: William Jacob Cobb, Jr., Atlanta, GA (US); Yandrapally RahulKrishna, Khammam District (IN); Saurabh Sinha, Bangalore (IN); Suresh Thummalapenta, Bellevue, WA (US)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 14/537,512

(22) Filed: Nov. 10, 2014

(65) Prior Publication Data

US 2016/0132421 A1    May 12, 2016

(51) Int. Cl.
G06F 9/44         (2006.01)
G06F 11/36        (2006.01)

(52) U.S. Cl.
CPC ........ *G06F 11/3688* (2013.01); *G06F 11/368* (2013.01); *G06F 11/3664* (2013.01); *G06F 11/3604* (2013.01); *G06F 11/3668* (2013.01)

(58) Field of Classification Search
None
See application file for complete search history.

(56) References Cited

U.S. PATENT DOCUMENTS

| | | | | |
|---|---|---|---|---|
| 7,165,240 B2 * | 1/2007 | Patterson | ............... | G06F 9/4443 706/20 |
| 7,478,365 B2 * | 1/2009 | West | .................. | G06F 11/3684 714/E11.208 |
| 7,685,576 B2 * | 3/2010 | Hartmann | ........... | G06F 11/3684 717/105 |
| 7,856,619 B2 * | 12/2010 | He | ....................... | G06F 11/3684 715/763 |
| 8,078,448 B1 * | 12/2011 | Wohlberg | ........... | G06F 11/3664 703/23 |
| 8,239,835 B2 * | 8/2012 | Rex | ...................... | G06F 11/3684 717/127 |

(Continued)

FOREIGN PATENT DOCUMENTS

WO    W02013017054 A1    7/2013

OTHER PUBLICATIONS

Thummalapenta et al.; "Automating Test Automation", IBM T.J. Watson Research Center, IEEE 2012; (Thummalapenta_2012.pdf; pp. 1-11).*

(Continued)

*Primary Examiner* — Hiren Patel
(74) *Attorney, Agent, or Firm* — Ference & Associates LLC (57) ABSTRACT

Embodiments provide a computerized method for adapting automating test scripts, said method including: utilizing at least one processor to execute computer code that performs the steps of: receiving, at an input device, an original test script created to test an application; utilizing the original test script to test, using the processor, a variant of the application; identifying, using the processor, failures in the original test script when the variant of the application is being tested; and modifying, using the processor, the original test script to overcome the identified failures.

14 Claims, 7 Drawing Sheets

(56) References Cited

U.S. PATENT DOCUMENTS

| | | | | |
|---|---|---|---|---|
| 8,312,428 | B2* | 11/2012 | Zhao | G06F 9/4448 715/209 |
| 8,370,811 | B2* | 2/2013 | Grechanik | G06F 11/368 717/125 |
| 8,473,914 | B2* | 6/2013 | Bergman | G06F 9/45512 717/124 |
| 8,954,933 | B2* | 2/2015 | Bullard | G06F 11/368 717/125 |
| 8,984,349 | B2* | 3/2015 | Sadasivam | G06F 11/3664 714/46 |
| 9,064,057 | B2* | 6/2015 | Shen | G06F 11/3688 |
| 9,189,135 | B2* | 11/2015 | Chaturvedi | G06F 11/368 |
| 9,274,934 | B2* | 3/2016 | Chandra | G06F 11/3684 |
| 9,507,697 | B2* | 11/2016 | Gyure | G06F 11/3688 |
| 2004/0044993 | A1* | 3/2004 | Muller | G06F 11/3684 717/124 |
| 2006/0117222 | A1* | 6/2006 | Shen | G06F 8/31 714/38.14 |
| 2008/0282230 | A1* | 11/2008 | Belvin | G06F 11/3692 717/125 |
| 2009/0217302 | A1 | 8/2009 | Grechanik et al. | |
| 2011/0283261 | A1* | 11/2011 | Yun | G06F 11/3684 717/124 |
| 2012/0023485 | A1 | 1/2012 | Dubey et al. | |
| 2015/0026665 | A1* | 1/2015 | Chen | G06F 11/3696 717/124 |
| 2015/0074645 | A1* | 3/2015 | Herrin | G06F 11/368 717/124 |
| 2015/0212927 | A1* | 7/2015 | N'Gum | G06F 11/3664 717/125 |
| 2015/0278076 | A1* | 10/2015 | Bs | G06F 11/3664 714/38.1 |
| 2015/0301071 | A1* | 10/2015 | Dhan | G01N 35/0092 702/108 |
| 2015/0363300 | A1* | 12/2015 | Luan | G06F 11/3684 714/38.1 |
| 2016/0004628 | A1* | 1/2016 | Gugri | G06F 11/3688 717/124 |

OTHER PUBLICATIONS

Thummalapenta et al.; "Efficient and Change-Resilient Test Automation: An Industrial Case Study", IBM T.J. Watson Research Center, IEEE 2013; (Thummalapenta_2013.pdf; pp. 1-10).*

Thummalapenta et al. "Guided Test Generation for Web Applications", IBM T.J. Watson Research Center, IEEE 2013; (Suresh_2013.pdf; pp. 1-10).*

Xiaochun et al.; "A Test Automation Solution on GUI Functional Test", IEEE 2008; (Zhu_2008.pdf; pp. 1-6).*

Huang, Si, et al., "Repairing GUI Test Suites Using a Genetic Algorithm", Third International Conference on Software Testing, Verification, and Validation (ICST), Apr. 7-9, 2010, Paris, France, pp. 245-254, IEEE Computer Society.

Yandrapally, Rahulkrishna, et al., "Robust Test Automation Using Contextual Clues", IBM Research Report, RI14005, Computer Science, Feb. 21, 2014, 19 pages, IBM T.J. Watson Research Center, Yorktown Heights, NY, USA.

* cited by examiner

ADAPTATION OF AUTOMATED TEST SCRIPTS

BACKGROUND

Typically, in industrial practice, system or end-to-end application tests are written in terms of steps described in natural language. The tests are intended for use by humans (e.g., the tester, who performs the test steps manually via the application's Graphical. User Interface (GUI)). In order to attain repeatable, predictable, and efficient executions, automated test scripts can be created based on the manual tests, using a general-purpose programming language (e.g., Java, VBScript, or JavaScript programs). These scripts are automatically interpretable and attempt to mimic the user actions on the GUI.

The growing demand for mobile devices combined with the ever expanding variety of options (e.g., manufactures, operating systems, browser types, device dimensions, device capabilities, etc.) has created a growing need for the rigorous and extensive testing of mobile applications. This growing need combined with the time consuming nature of testing has created a further need for streamlined and automated methods of testing. The wide array of applications available cause the testing process to be extremely human intensive. In addition to traditional desktop and web applications, applications can be implemented to run on various platforms, devices, browsers, and often have different variants (e.g., phone and tablet variants, native-app and web-app variants).

BRIEF SUMMARY

In summary, one aspect of the invention provides a computerized method for adapting automating test scripts, said method comprising: utilizing at least one processor to execute computer code that performs the steps of: receiving, at an input device, an original test script created to test an application; utilizing the original test script to test, using the processor, a variant of the application; identifying, using the processor, failures in the original test script when the variant of the application is being tested; and modifying, using the processor, the original test script to overcome the identified failures.

Another aspect provides an apparatus for adapting automating test scripts comprising: at least one processor; an input device; and a computer readable storage medium having computer readable program code embodied therewith and executable by the at least one processor, the computer readable program code comprising: computer readable program code configured to receive, at an input device, an original test script created to test an application; computer readable program code configured to utilize the original test script to test, using the processor, a variant of the application; computer readable program code configured to identify, using the processor, failures in the original test script when the variant of the application is being tested; and computer readable program code configured to modify, using the processor, the original test script to overcome the identified failures.

A further aspect provides a computer program product for adapting automating test scripts, said computer program product comprising: computer readable program code configured to receive, at an input device, an original test script created to test an application; computer readable program code configured to utilize the original test script to test, using the processor, a variant of the application; computer readable program code configured to identify, using the processor, failures in the original test script when the variant of the application is being tested; and computer readable program code configured to modifying, using the processor, the original test script to overcome the identified failures.

A still further aspect provides a method for adapting automating test scripts, said method comprising: utilizing at least one processor to execute computer code that performs the steps of: receiving, at an input device, an original test script created to test an application; utilizing the original test script to test, using the processor, a variant of the application; identifying, using the processor, failures in the original test script when the variant of the application is being tested; executing, upon failure to identify an exact match, a k-limited local crawl to perform an action selected from the group consisting of: locating missing elements of the original test script, deleting an existing step in the original test script, and replacing a step in the original test script with an alternative sequence of steps; creating metrics to weight a plurality of alternate elements to the element causing one of the failures, wherein the metrics are determined based on characteristics selected from the group consisting of: term overlap, synonyms, image similarity, image-label association, and prior success; modifying, using the processor, the original test script to overcome the identified failures; creating a repair model upon successfully modifying the original test script; storing the test script step and corresponding status of the screen of each step utilized in creating the repair model; utilizing the repair model during subsequent testing of additional variants of the application.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "one implementation" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

As stated, the mass adoption of application based devices and the explosion of available applications for those devices has created a need for a new method of testing those applications. The current methods for testing applications are very human intensive, and therefore extremely costly and time intensive. Typically, an application is designed and implemented across a broad range of environments (e.g., traditional desktop and web applications, applications for various platforms, different devices, different browsers, etc.). Thus, one application can have multiple variants to allow for operation on a diverse set of hardware systems and software environments.

Although the available variants provide, generally, the same or similar functionalities, due to the variety of abilities of the devices (e.g., touch screen, screen size, available hardware buttons, etc.), some application variants have a very different look and feel to them. Additionally, the applications can follow a different process or follow different flows in order to achieve the same or similar functionality (e.g., traversing multiple pages on a smart phone whereas a single page is sufficient on a tablet). Many times, these differences are due to differences in native features provided by underlying platforms or devices (e.g., processing ability, storage availability, application store guidelines, available hardware keys, etc.). As an example, a tablet device provides a bigger screen compared to traditional smart phone, and thus an application's display page may need to be split into multiple pages to display the same amount of information on a phone as on a tablet.

Because of these many differences, a script automated on one platform/device/app-variant is unlikely to properly execute on a different platform/device/app-variant. Typically, this complexity of formats and requirements forces developers to build and maintain multiple test scripts for each manual test case thereby, complicating both the implementation process and maintenance efforts of testing applications.

This inefficient system has driven the need to reduce both the implementation and maintenance efforts of application testers. In particular, a method that accepts automated scripts for operation on a single platform or device with the ability to adapt those scripts to other platforms or devices is needed.

In one implementation, a method accepts an inputted test script designed for a single application variant, and then adapts that test script to enable the testing of other application variants. First, the method executes the given test script on the original variant (e.g., the application, including platform and device, for which it was originally designed) to generate a dynamic trace that captures each state after a proper execution of each step contained within the sequential test script.

In a further implementation, a method executes the test script on a new variant of the application. If/when the method detects a failing step (i.e., the script is unable to complete the next step in the script sequence), it compares the captured application state, contained within the dynamic trace, with the current application state as it appears in the new variant. This enables the system to identify any alternate actions or elements that could possibly enable the test script to adapt. This method of comparing old and new states, when evaluating a failing step, helps identify candidate elements as well as the proper corresponding actions to take regarding those candidate elements to enable the execution of the remaining steps in the script.

In an even further implementation, the method chooses an element and performs the action associated with that element within the application. If a selected element and the corresponding action on that element fail to advance the application further in the sequential testing process, the method performs k-limited local crawl with backtracking to search for a sequence of actions that is an alternative for the failing step of the sequence. This ability enables the method to not only find missing elements on a particular screen, but enables the ability to remove (i.e., delete) a step from the test script or find missing element candidates on any screen within a given application. This allows for automated testing to handle a wide range of mobile or desktop applications and platforms on a variety of devices. The ability to adjust in a dynamic way is primarily based on the application GUI. This enables the testing application to avoid issues typically associated with relying on any underlying technologies (e.g., programming language, application function, etc.) thus allowing the method to apply to all types of applications.

In an additional implementation, various optimizations methods are used, generally for mobile applications, which are designed to assist in the selecting of candidate elements. This assistance ensures that the elements that are more likely to advance the sequential testing are efficiently selected for the following step in the script, and thereby adapting the script. Unlike traditional desktop and web applications, wherein the majority of elements can easily be identified using textual labels (e.g., file, edit, close, etc.), mobile applications make extensive use of images for navigation and operation.

Therefore, an implementation involves a method utilizing techniques, such as, for example, computing image similarities across multiple variants to effectively deal with the selection of element candidates that are image based. Furthermore, a further implementation also incrementally builds a repair model using the successful adaptations discovered though the above methods and leverages that repair model in subsequent executions of the test script in order to further increase the efficiency while adapting subsequent instances of the test script to run on differing variants.

The description now turns to the figures. The illustrated embodiments of the invention will be best understood by reference to the figures. The following description is intended only by way of example and simply illustrates certain selected exemplary embodiments of the invention as claimed herein.

Specific reference will now be made here below to FIG. 1-6. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 7. In accordance with an exemplary embodiment, most if not all of the process steps, components and outputs discussed with respect to FIGS. 1-6 can be performed or utilized by way of a processing unit or units and system memory such as those indicated, respectively, at 16' and 28' in FIG. 7, whether on a server computer, a client computer, a node computer in a distributed network, or any combination thereof.

Figure 1:
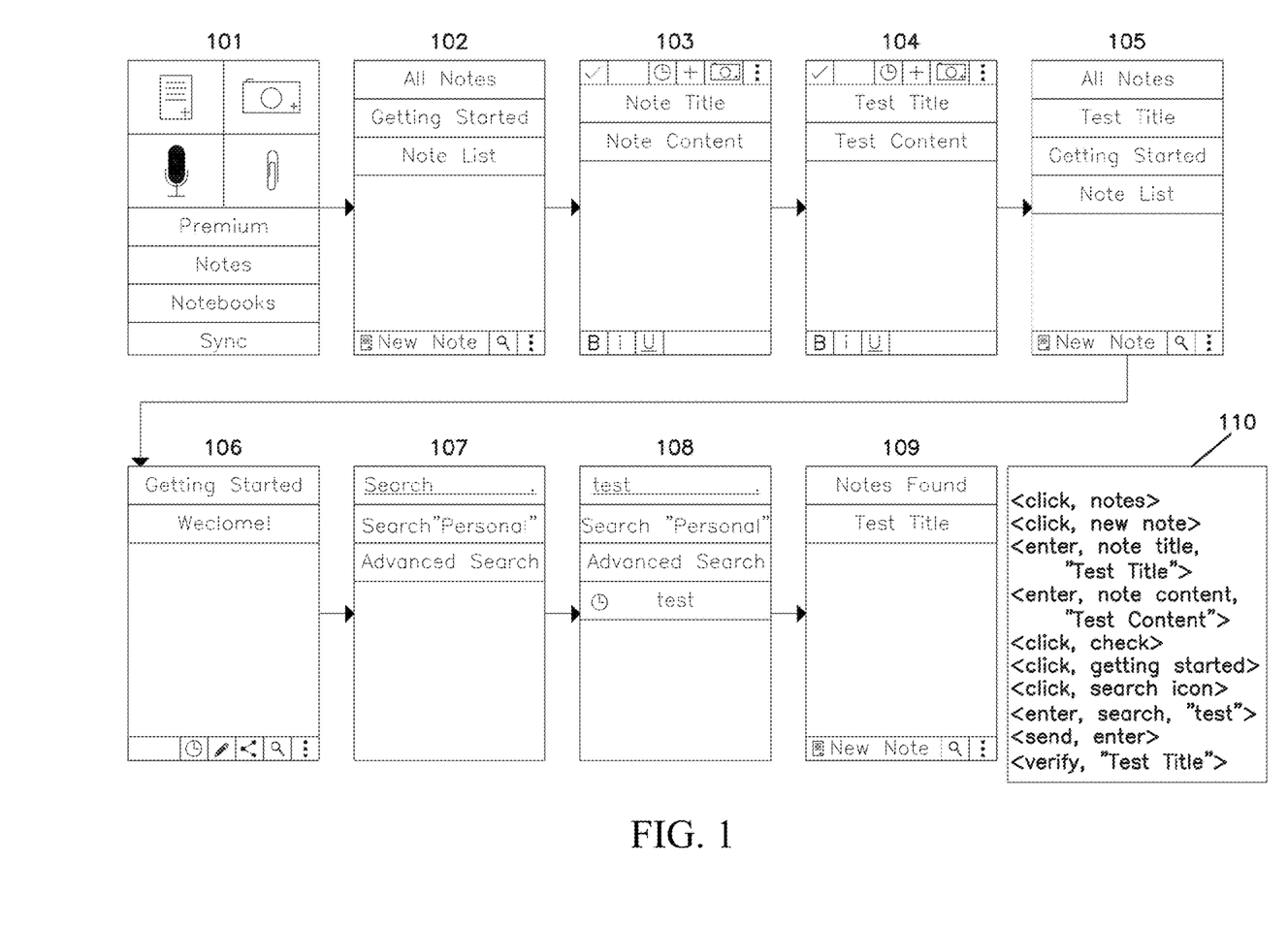
FIG. 1 illustrates an original test script sequence and the accompanying screen status captures.

In accordance with an implementation, FIG. 1 shows a first step of receiving at an input device, an original test sequence 110. Typically the test sequence consists of a list of predetermined criteria that the test developer wishes to validate (e.g., clicking certain icons, entering certain text, preforming certain functions within the application, etc.). By way of example, FIG. 1 shows the captured display of a typical device (e.g., a smart phone, tablet, eReader, PC, etc.) running a note taking application (e.g., EVERNOTE, ONENOTE, etc.) at each step of the test script. EVERNOTE is a registered trademark of Evernote Corporation in the United States and other jurisdictions. ONENOTE is a registered trademark of Microsoft Corporation in the United States and other jurisdictions. Step 1 of the script is <click, notes> and the corresponding display, on which the step is performed, is shown at 101. Step 2 is <click, new note> and the corresponding display is shown at 102. Step 3 is <enter, note title, "Test title"> and the corresponding display is shown at 103. Step 4 is <click, check> and the corresponding display is shown at 104. Step 5 is <click, getting started> and the corresponding display is shown at 105. Step 6 is <click, search icon> and the corresponding display is shown at 106. Step 7 is <enter, search, "test"> and the corresponding display is shown at 107. Step 8 is <send, enter> and the corresponding display is shown at 108. Step 9 is <verify, "test title"> and the corresponding display is shown at 109.

A further implementation uses original test sequence 110, to test additional applications, (e.g., other variants of the application) for failures. Once a failure is detected (e.g., a missing icon, a missing text box, etc.), the implementation modifies the original test sequence to accommodate the variant application's missing or relocated element.

A still further implementation captures the screen status of the original variant of the application at each step of the original test script 101-109, and creates a dynamic trace record. By way of example, the method then utilizes the dynamic trace to measure the conformity of other variants of the application (i.e., the screen status of the new variant application is compared to the screen status of the original application), and to discover what, if any, identical matches exist.

Figure 2:
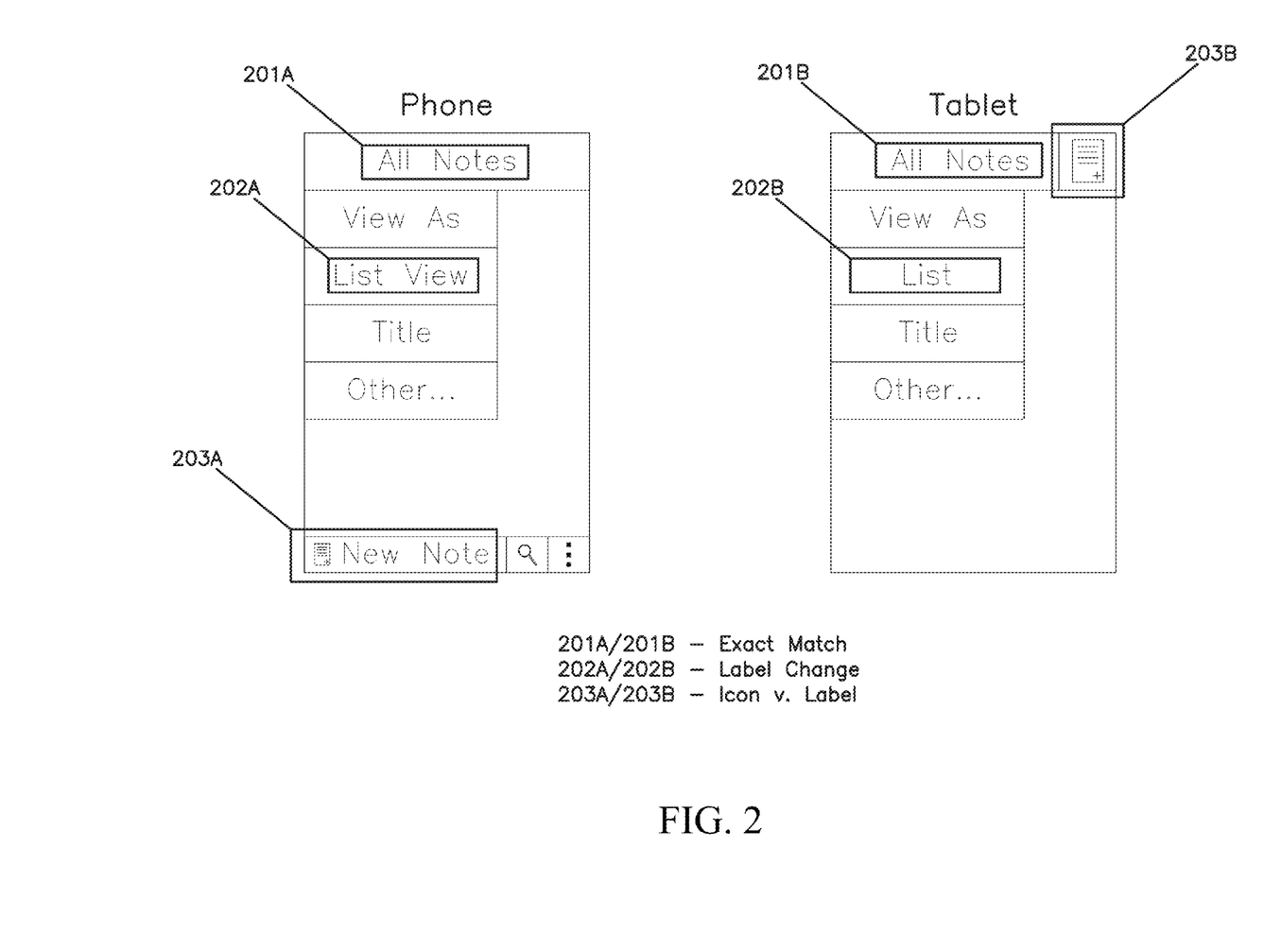
FIG. 2 shows an example of possible changes between variants of an application according to an embodiment.

Referring now to FIG. 2, by way of example, a note taking application is again shown. The display labeled "Phone" corresponds to a screen status of an application on a phone, whereas the display labeled "Tablet" corresponds to a screen status of an application on a Tablet. By way of example, FIG. 2 shows an exact match, 201A and 201B, for the target element of a test script step <click, all notes>.

Furthermore, FIG. 2 shows a failure of the script, 202A and 202B due to a label change. As shown, the phone variant contains the terms "List View" whereas the tablet variant only contains the term "List." This would cause a failure in the script sequence, due to the terms comprising the element being different, and would typically require a human intervention to correct. Moreover, 203A and 203B show a failure of the script due to an icon being used to replace a label. This would cause a similar failure in the script sequence, due to the differing text and icon size/location.

In an additional implementation, when a failure of the original test script occurs during the testing of a new variant (e.g., 202A/202B and 203A/203B), a k-limited local crawl is initiated. The k-limited local crawl, wherein k is the maximum depth up to which the application is explored to search for a repair sequence (all elements available on the screen where the crawl is initiated are at depth k=1, all elements on a screen reached after performing an action on an element from the initial screen are at depth k=2, and so on), functions as a tool to locate missing elements by a variety of methods thus allowing the test sequence to progress to the following sequential step of the script. The k-limited local crawl helps overcome some of the limitations of using conventional depth-first or breadth-first search strategies, where the search process can get stuck without making any progress (e.g., stuck on the same screen with no alternative elements to choose from). As an alternative to breadth-first exploration (illustrated above), the k-limited local crawl can proceed in a depth-first manner.

In an implementation, the k-limited local crawl may be a heuristic-guided search. Once the exact matches are eliminated using, for example, a robust test automation tool (e.g., record-replay, automating the test-automation (ATA), automating the test-automation qui vicino (ATA-QV), etc.), the local crawl will then begin to identify all possible candidate elements as alternatives. (ATA and ATA-QV are test automation software developed by International Business Machines (IBM) of Armonk, N.Y.) Additionally, the local crawl will weight each candidate based on a combination of predefined metrics (e.g., term overlap, synonyms, image similarity, image-label association, prior success, etc.). This weighting allows for the most likely candidate element to be selected, thereby increasing the efficiency of the adaptation process. Moreover, the predefined metric can be weighted based on its importance. By way of example, an equation for the weighting process could be:

$$\text{Weight} = w_0 m_0 + w_1 m_1 + \ldots + w_k m_k \text{: where } m_i \text{ is a metric and } w_i \text{ is the importance of the metric.}$$

Figure 3:
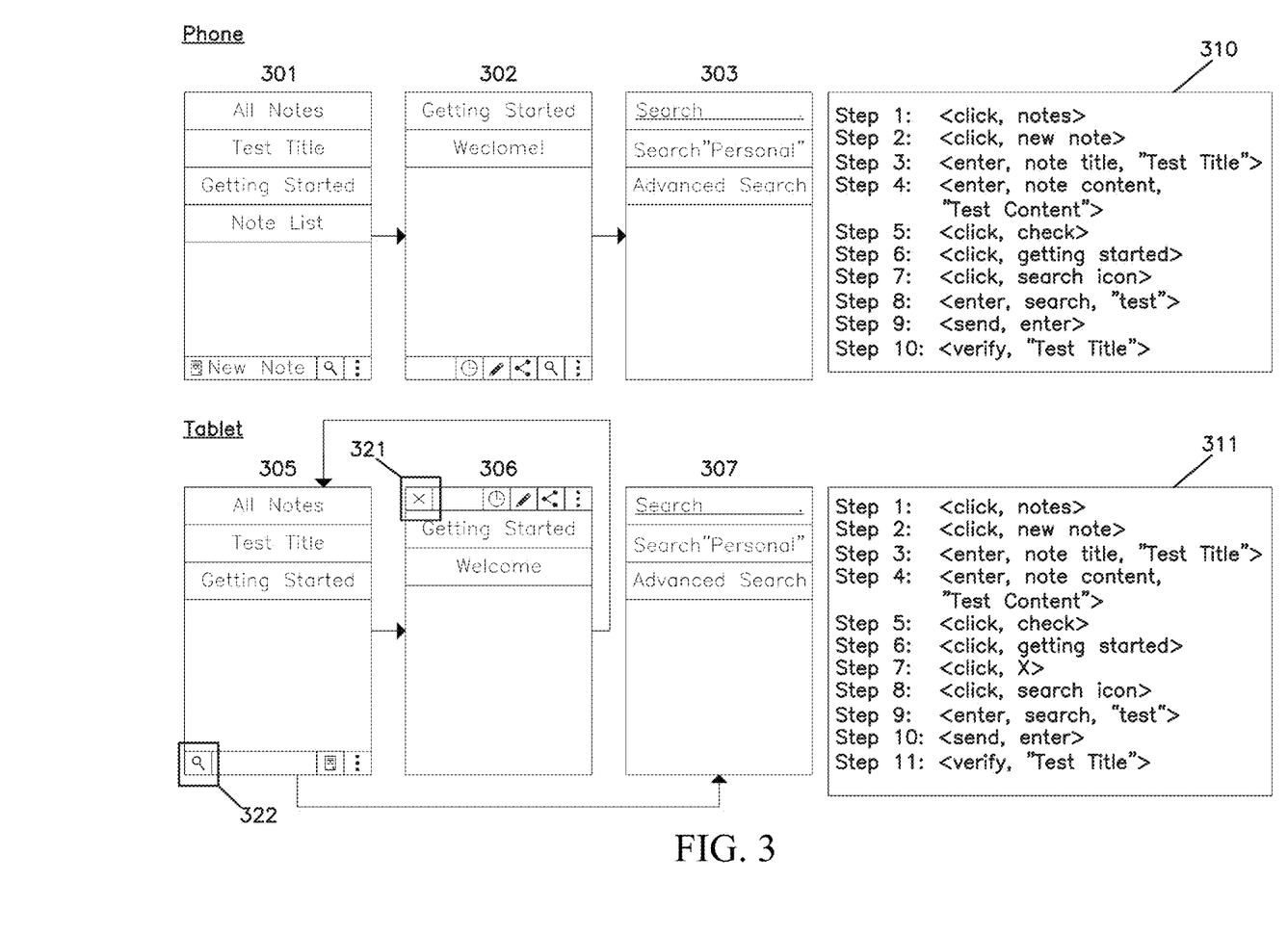
FIG. 3 illustrates a corresponding test flow for two individual application variants.

Referring now to FIG. 3, in accordance with another implementation, the local crawl may create additional steps within the application. As shown in FIG. 3, which is based on an original test script, Step 7 <click, search icon> 310 should correlate to 302 and 306. However no search icon is shown in 306. In comparison, the example of the phone screen status 302 has the element that is referred to in Step 7; thus when the script attempts to click the search icon at Step 7, the link is selected and the application advances to 303. Therefore, for the tablet variant, a local crawl is initiated on screen status 306 to explore the alternative elements that are available on screen status 306. During the crawl, one of the elements explored is the 'X' icon 321, which takes the application back to screen status 305. On screen status 305, the search icon 322 is available, which enables Step 7 of the test script to be performed and advances the application to screen status 307, on which Step 8 can be performed. Thus, the method creates an additional step (e.g., Step 7 at 311) and adds it to the sequence to allow the testing to complete.

Figure 4:
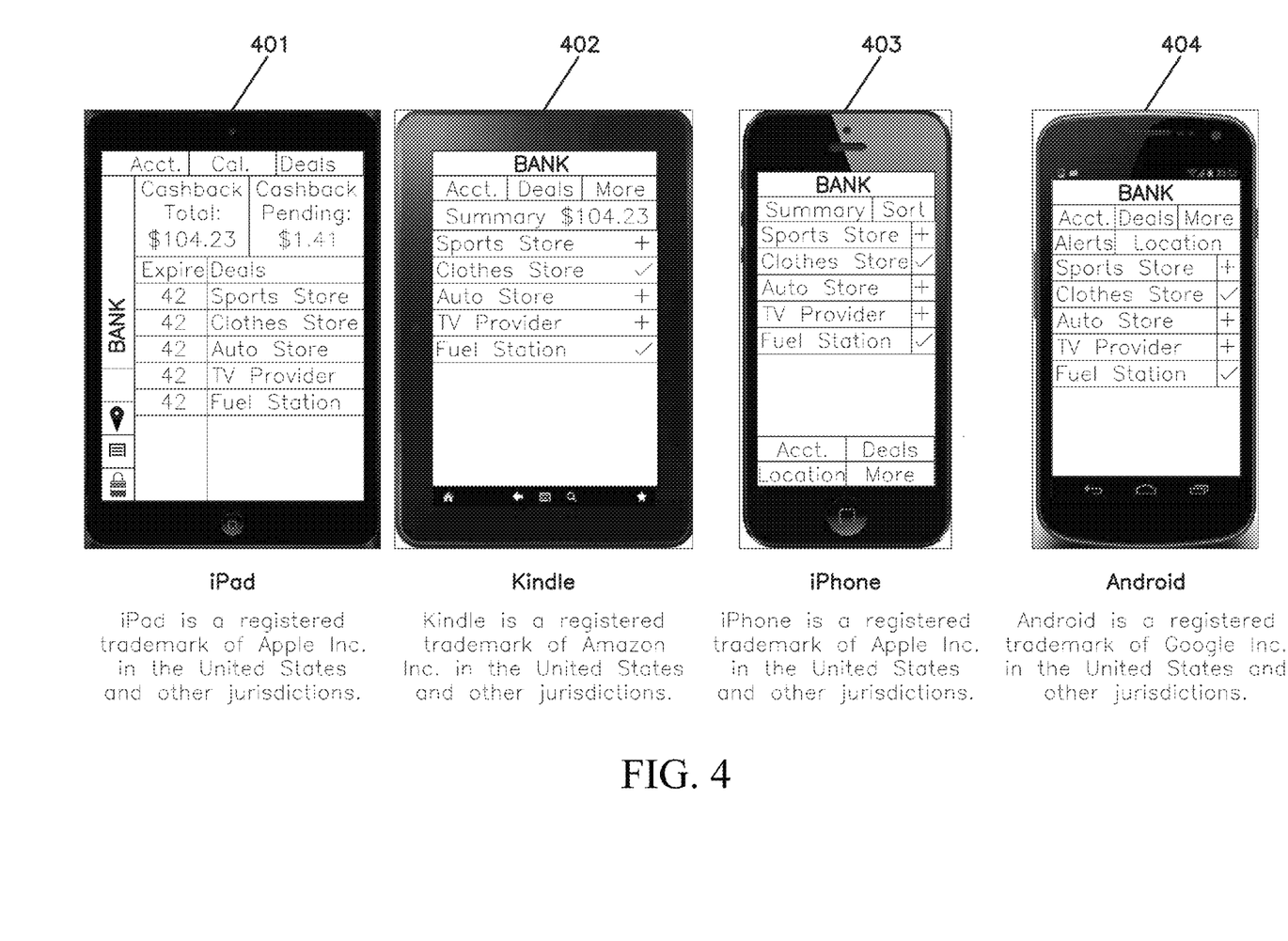
FIG. 4 shows examples of the variants encountered in the testing process according to an embodiment.

In an additional implementation, the scripted testing is carried out on applications of all types. Additionally, the scripted testing takes place across varying characteristics that affect how the application acts or is executed (e.g., different operating system platforms, varying devices, varying browsers, varying versions of the application, etc.). By way of example, FIG. 4 shows how different a single application can be when viewed on different devices. The screen size on the "IPAD" 401 and on the "KINDLE" 402 are similar, however the applications look completely different solely because of the operating system the application is running within. IPAD is a registered trade mark of Apple Inc. in the United States and other jurisdictions. KINDLE is a registered trade mark of Amazon Technologies Inc. in the United States and other jurisdictions. A similar result can be seen in the "ANDROID" phone 403 and the "IPHONE" 404. ANDROID is a registered trade mark of Google Inc. in the United States and other jurisdictions. IPHONE is a registered trade mark of Apple Inc. in the United States and other jurisdictions. These variations, no matter how slight, can create enormous problems for an automated testing system that is designed around one implementation of the application and then utilized to test on other variants.

Figure 5:
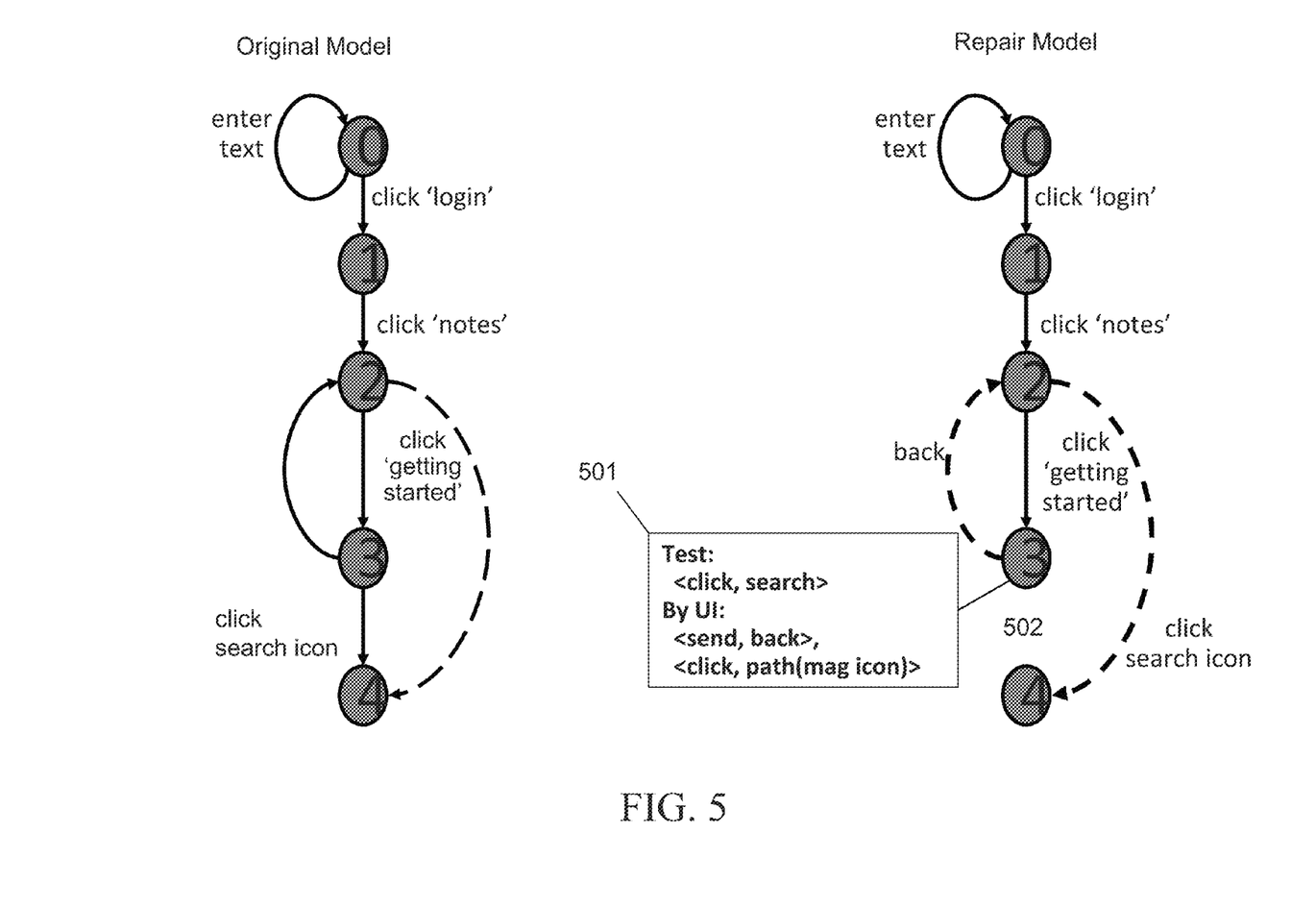
FIG. 5 schematically illustrates the configuration of a repair model according to an embodiment.

In an additional implementation, a repair model is created. The repair model is created when modifications to the original script sequence are required and a successful test sequence is completed through the use of those modifications. A repair model is represented as an augmented state transition diagram, in which nodes represent user-interface states, or abstractions of concrete states, of the application. Additionally, directed labeled edges represent actions available in the source node's state and resulting in the target node's state. In a repair model, repair paths are associated with nodes.

By way of example, FIG. 5 shows an "Original Model" and a "Repair Model." In an implementation, when a script sequence results in a failure as shown by the break in continuity at 502, the local crawl attempts to locate a viable alternative. This can involve exploring alternative sequences of actions up to and including a limited depth via backtracking. When the local crawl locates a viable alternative sequence of actions, through any means, and the script is able to sequentially advance to a point of completion, a repair model of the adapted script is created and stored (i.e., the alternative sequence of commands 501 is added to the repair model for use in adaptations of other tests that also have the same test step in the same context), and also used to update the original sequence of commands.

Figure 6:
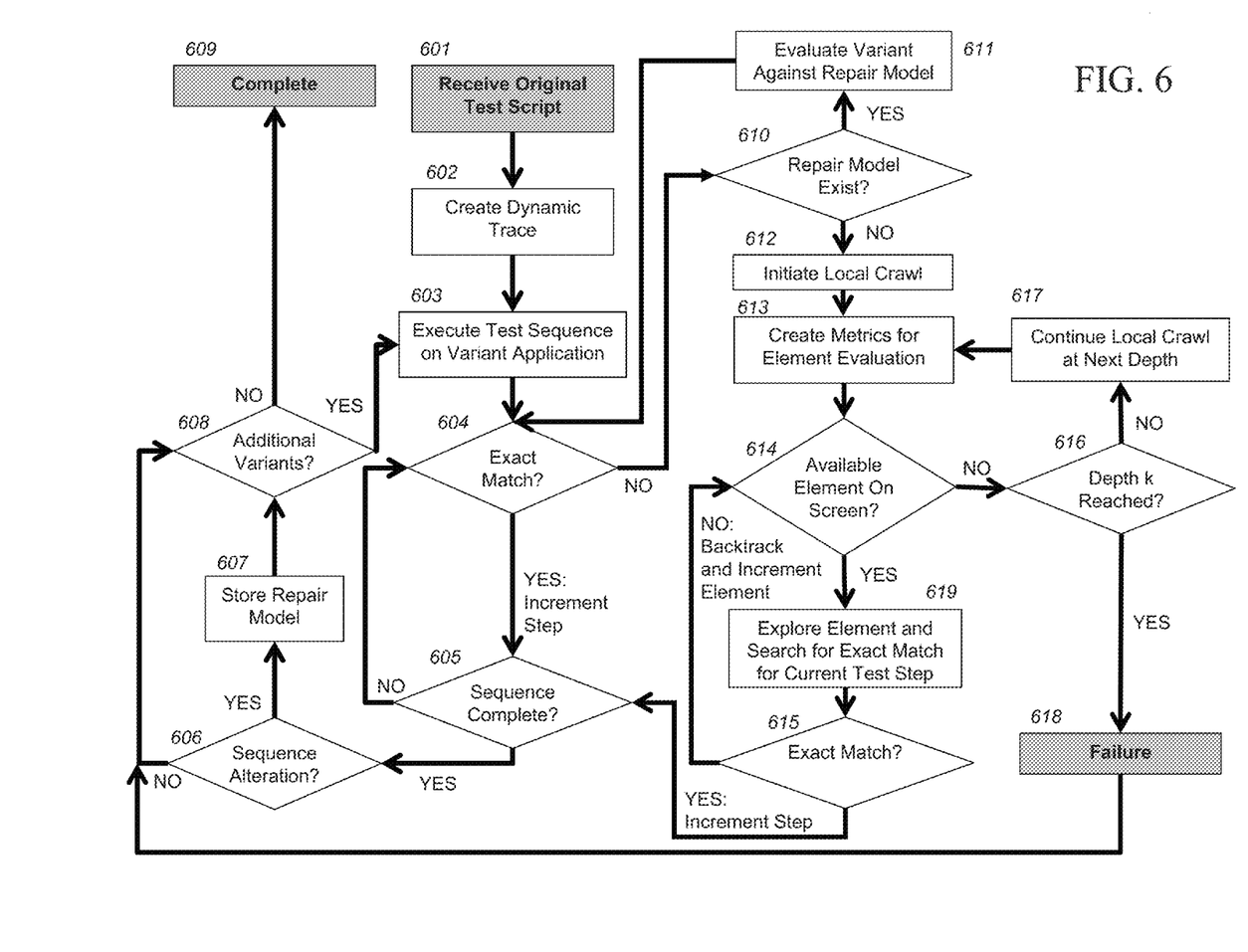
FIG. 6 sets forth a process for automated adaptation of test scripts more generally.

By way of example, FIG. 6 illustrates an example method of adapting automated test scripts. In a first step 601, an original test script is received (e.g., 110 from FIG. 1). Next, at 602 a method executes the given original test script on the original application variant (e.g., the application the test script was designed for). During the process of parsing through the original application variant, the screen status of each step is captured and combined to create a dynamic trace (e.g., FIGS. 1 and 3).

Having created the dynamic trace, a variant of the original application is tested in accordance with an implementation 603, and the first step of the variant is compared to the first step of the dynamic trace. If the dynamic trace and the variant application are an exact match 604, the script sequence is advanced one step and the process starts again. If, however, the sequence is complete 605 it will not begin the process again; instead it will look for additional variants 608. If no additional variants exist, the testing would be complete with regard to that specific application 609. However, if additional variants require testing 608, it would restart the testing process on the new application variant 603.

In a further implementation, if an exact match is not found 604, then a check must be made to determine if a previous repair model for the current application has been created 610. If a repair model exists, the new variant is compared against the repair model 611 instead of the dynamic trace of the original script 602. In an implementation, comparing against the repair model may increase the efficiency of test adaptation. This is because the repair model allows for the reuse of information about alternative viable repair sequences computed previously. Therefore, efficiency is increased because any repeated exploration (via local crawling) for the same failing action that appears in multiple original test scripts is avoided. If the variant application cannot identify an exact match within the repair model (i.e., an existing repair model does not cause the test script to be successfully adapted) the process will again check for further repair models 610 to evaluate the new variant against. If the test script exhausts all available repair models 610 and cannot successfully adapt, a local crawl 612 is initiated.

In accordance with a further implementation, a metric and weighting system are created based on a set of predetermined factors (e.g., term overlap, synonyms, image similarity, image-label association, prior success, etc.). As illustrated in FIG. 6, and in accordance with an implementation, once the metrics are created the current screen status of the application is evaluated for possible alternative elements 614 (i.e., the actual crawling of the screen status takes place). The process then selects any available elements 614 in order of their weighted value (e.g., the values assigned via the metrics evaluation 613). If a tested element is successful, the script sequence is advanced one step and tested for completion 605. However, if the selected element test is unsuccessful 615, the next most likely element, as determined by the metrics, is selected 614 until there are no remaining alternative elements on the current status screen 614.

In an even further implementation, and as illustrated in FIG. 6, when there are no remaining alternative elements on the current status screen, a check is done for a previous status screen 616. If a previous status screen exists, the testing sequence is backtracked to the previous screen status 617 and a new weighted metrics system is created based on the previous screen status 613. Finally, if all elements on a status screen have been exhausted 614 and all of the previous screen status possibilities have been exhausted (i.e., there is no where left to backtrack to), the test adaptation results in a failure 618. Upon failure, a check for additional variants 608 is carried out. If there are no additional variants, the testing process is complete 609.

In an additional implementation, and as illustrated in FIG. 6, if the local crawl 612 locates a viable alternative element 614, through any means, and the script is able to sequentially advance to a point of completion 605, a check is made to determine if a sequence alteration was required 606. If alteration was required (e.g., a variable alternative was selected and the test was completed), the altered script sequence is stored as a repair model 607 for use in adaptation of subsequent tests.

By way of example, the k-limited local crawl 612 is typically initiated when an exact match 604 is not found for an element referred to in a current test step of the sequence, and either no repair model 610 exists or the sequence in the repair model does not succeed 611. The crawling process may explore the application up to depth k in either a breadth-first manner or a depth-first manner. In an implementation, a breadth-first exploration may work as follows. It enumerates all elements available on the current screen status and ranks them according to the similarity metrics 613.

In an additional implementation, after enumerating all options to be tried, the current exploration depth is initialized and set to 1, and an exploration of an option is carried out by performing an action on the chosen element 619. This may take the application to a different screen status. On the following screen status, an attempt is made to execute the current step in the test sequence by searching for an exact match for the target element of the current test step 619. If an exact match is found and the execution succeeds 615, it increments the step and goes on to the next step 605 in the original test script. The alternative sequence is then recorded the in the repair model 607.

If no exact match for the element currently being analyzed is found 615, an exploration of the next available element 614 needs to be performed. In an implementation, a backtracking action may be required to take the application from the current screen to the screen on which the next available element can be explored. Backtracking, in general, involves taking the application from the current screen to a previous screen so that crawling can explore another alternative element on that screen.

By way of example, after all options at the previous screen are explored without success, a check is made to determine if the exploration depth limit (e.g., k) has been reached 616. If the depth limit has not been reached, an exploration of all options at the next depth is required (i.e., local crawling continues at the next depth) 617. Thus, a ranked list of elements 613 is created to explore all the elements at all the reached screen statuses. In an implementation, the current exploration depth is incremented and an exploration of the enumerated elements on all screens at the next depth is conducted. If a depth of k in the incremental process is reached 616, the method has failed to adapt the test script 618.

In a further implementation, an action (e.g., sequential step of the test procedure), can be added, replaced, or deleted from the original test script during its execution on a different variant. By way of example, step deletions and replacements in the original test script may be handled in the following way. In enumerating the elements on a screen for exploration, an implementation also adds a special NO-OP option to the list. While exploring the NO-OP option on a screen status for the current test step, the sequence step is incremented to the next step in the sequence and then searches for an exact match for the element referred to in following step on the current screen status. Therefore, if the exploration of NO-OP succeeds at depth 1 (i.e., advancing one step in the sequence), it amounts to deleting the previous step in the original test script in the process of adaptation. If NO-OP succeeds at depth n, where 1<n<=k, this translates to replacing the original step with an alternative sequence of steps of length n−1. In a further implementation, multiple NO-OPs may be attempted to simulate the replacement of a sequence of steps in the original script with a viable alternative sequence of steps.

In accordance with at least one implementation of the invention, quantitative scores or values as determined herein (e.g., metrics to weight a plurality of alternative elements) can be stored in memory or displayed to a user on a screen, as might fit the needs of one or more users.

Figure 7:
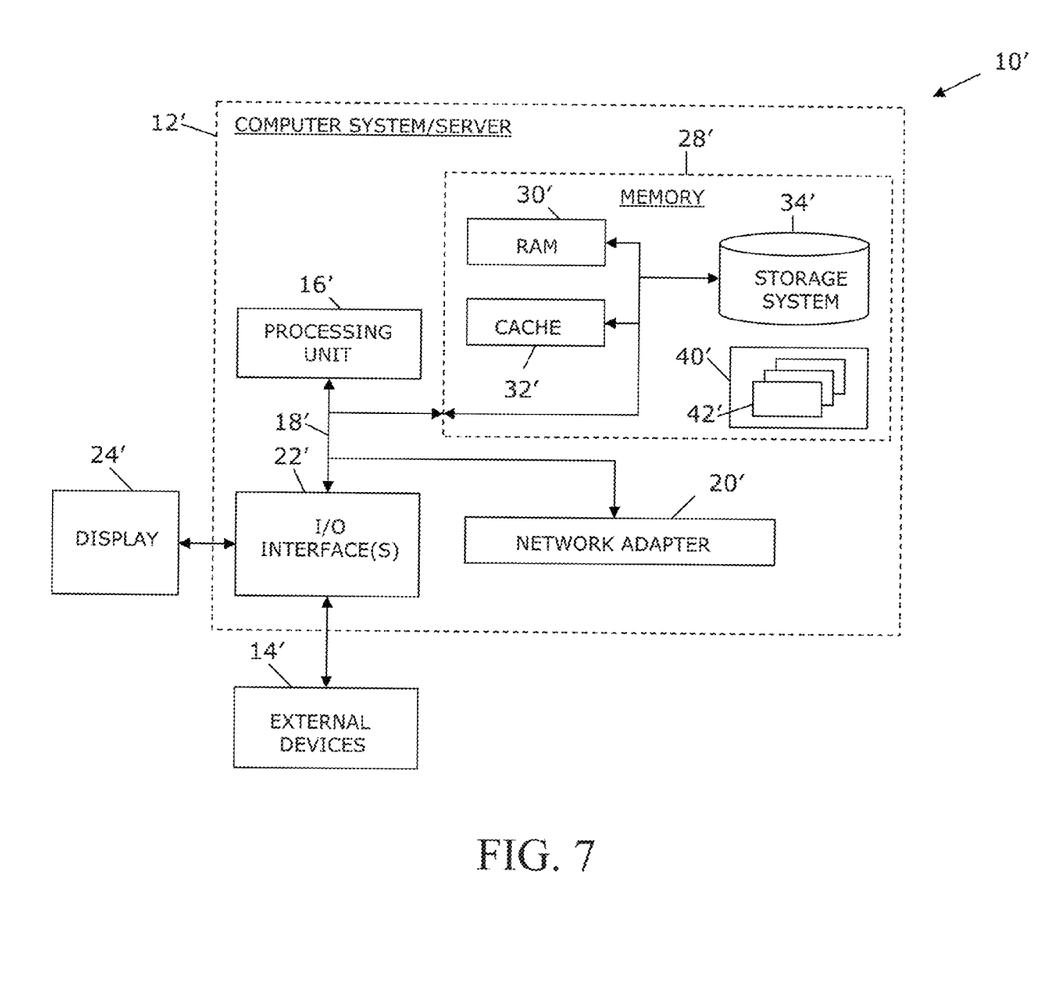
FIG. 7 illustrates a computer system.

It should be appreciated that a process such as that broadly illustrated in FIG. 6 can be carried out on essentially any suitable computer system or set of computer systems, which may, by way of an illustrative and non-restrictive example, include a system such as that indicated at 12' in FIG. 7. In accordance with an example implementation, most if not all of the process steps discussed with respect to FIG. 6 can be performed by way of a processing unit or units and system memory such as those indicated, respectively, at 16' and 28' in FIG. 7.

Referring now to FIG. 7, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computerized method for adapting automating test scripts, said method comprising:
   utilizing at least one processor to execute computer code that performs the steps of:
   receiving, at an input device, an original test script created to test an application, wherein the input device comprises a different execution environment than the original test script environment;
   utilizing the original test script to test, using the processor, a variant of the application;
   identifying, using the processor, failures in the original test script when the variant of the application is being tested, wherein the identifying failures comprises capturing a status of the screen after execution of a step in the original test script;
   comparing the captured status of a screen to a status of a screen of the variant application;
   executing, upon failure to identify an exact match of an element causing one of the failures of the original test script, a k-limited local crawl of the status of a screen and a previous status of the screen to perform an action selected from the group consisting of: locating missing elements of the original test script, deleting an existing step in the original test script, and replacing a step in the original test script with an alternative sequence of steps, wherein executing a k-limited local crawl of the previous status of the screen comprises executing a backtrack to a previous status of the screen of the original test script;
   the k-limited local crawl having a maximum depth corresponding to a number of statuses of the screen to access and comprising a heuristic-guided search to search for a missing element to generate a repair sequence for the element causing one of the failures;
   creating metrics to weight a plurality of alternate elements to the element causing one of the failures, wherein the metrics are determined based on characteristics selected from the group consisting of: term overlap, synonyms, image similarity, image-label association, and prior success; and
   modifying, using the processor, the original test script to overcome the identified failures for the different execution environment.

2. The method of claim 1, comprising:
   executing the original test script on the application; and
   wherein the capturing the status of the screen comprises creating a dynamic trace.

3. The method of claim 1, comprising:
   determining one of the plurality of elements to be tested;
   wherein the alternate element is selected based on the weight assigned to the alternate element by the metrics.

4. The method of claim 1, comprising: creating a repair model upon successfully modifying the original test script.

5. The method of claim 4, comprising: storing the test script step and corresponding status of the screen of each step utilized in creating the repair model.

6. The method of claim 5, comprising: testing additional variants of the application utilizing the repair model.

7. The method according to claim 1, wherein the testing is carried out on variant applications with differing characteristics selected from a group consisting of operating system platforms, varying devices, varying browsers, varying versions of the application.

8. An apparatus for adapting automating test scripts comprising:
   at least one processor;
   an input device; and
   a computer readable storage medium having computer readable program code embodied therewith and executable by the at least one processor, the computer readable program code comprising:
   computer readable program code configured to receive, at an input device, an original test script created to test an application, wherein the input device comprises a different execution environment than the original test script environment;
   computer readable program code configured to utilize the original test script to test, using the processor, a variant of the application;

computer readable program code configured to identify, using the processor, failures in the original test script when the variant of the application is being tested, wherein the identifying failures comprises capturing a status of the screen after execution of a step in the original test script;

computer readable program code configured to compare the captured status of a screen to a status of a screen of the variant application;

computer readable program code configured to execute, upon failure to identify an exact match of an element causing one of the failures of the original test script, a k-limited local crawl of the status of a screen and a previous status of the screen to perform an action selected from the group consisting of: locating missing elements of the original test script, deleting an existing step in the original test script, and replacing a step in the original test script with an alternative sequence of steps, wherein executing a k-limited local crawl of the previous status of the screen comprises executing a backtrack to a previous status of the screen of the original test script;

the k-limited local crawl having a maximum depth corresponding to a number of statuses of the screen to access and comprising a heuristic-guided search to search for a missing element to generate a repair sequence for the element causing one of the failures;

computer readable program code configured to create metrics to weight a plurality of alternate elements to the element causing one of the failures, wherein the metrics are determined based on characteristics selected from the group consisting of: term overlap, synonyms, image similarity, image-label association, and prior success; and computer readable program code configured to modify, using the processor, the original test script to overcome the identified failures for the different execution environment.

9. A non-transitory computer program product for adapting automating test scripts, said computer program product comprising:

computer readable program code configured to receive, at an input device, an original test script created to test an application, wherein the input device comprises a different execution environment than the original test script environment;

computer readable program code configured to utilize the original test script to test, using the processor, a variant of the application;

computer readable program code configured to identify, using the processor, failures in the original test script when the variant of the application is being tested, wherein the identifying failures comprises capturing a status of the screen after execution of a step in the original test script;

computer readable program code configured to compare the captured status of a screen to a status of a screen of the variant application;

computer readable program code configured to execute, upon failure to identify an exact match of an element causing one of the failures of the original test script, a k-limited local crawl of the status of a screen and a previous status of the screen to perform an action selected from the group consisting of: locating missing elements of the original test script, deleting an existing step in the original test script, and replacing a step in the original test script with an alternative sequence of steps, wherein executing a k-limited local crawl of the previous status of the screen comprises executing a backtrack to a previous status of the screen of the original test script;

the k-limited local crawl having a maximum depth corresponding to a number of statuses of the screen to access and comprising a heuristic-guided search to search for a missing element to generate a repair sequence for the element causing one of the failures;

computer readable program code configured to create metrics to weight a plurality of alternate elements to the element causing one of the failures, wherein the metrics are determined based on characteristics selected from the group consisting of: term overlap, synonyms, image similarity, image-label association, and prior success; and computer readable program code configured to modifying, using the processor, the original test script to overcome the identified failures for the different execution environment.

10. The computer program product of claim 9, comprising: computer readable program code configured to:
execute the original test script on the application;
the capturing the status of the screen comprises creating a dynamic trace.

11. The computer program product of claim 9, comprising: computer readable program code configured to:
create metrics to weight a plurality of alternate elements to the element causing one of the failures;
wherein the metrics are determined based on characteristics selected from the group consisting of: term overlap, synonyms, image similarity, image-label association, and prior success.

12. The computer program product of claim 9, comprising: computer readable program code configured to:
create repair model upon successfully modifying the original test script; and
test additional variants of the application utilizing the repair model.

13. The computer program product according to claim 9, wherein the testing is carried out on variant applications with differing characteristics selected from a group consisting of operating system platforms, varying devices, varying browsers, varying versions of the application.

14. A method for adapting automating test scripts, said method comprising:

utilizing at least one processor to execute computer code that performs the steps of:

receiving, at an input device, an original test script created to test an application, wherein the input device comprises a different execution environment than the original test script environment;

utilizing the original test script to test, using the processor, a variant of the application;

identifying, using the processor, failures in the original test script when the variant of the application is being tested, wherein the identifying failures comprises capturing a status of the screen after execution of a step in the original test script;

comparing the captured status of a screen to a status of a screen of the variant application;

executing, using the processor, upon failure to identify an exact match of an element causing one of the failures of the original test script, a k-limited local crawl of the status of a screen and a previous status of the screen to perform an action selected from the group consisting of: locating missing elements of the original test script, deleting an existing step in the original test script, and replacing a step in the original test script with an alternative sequence of steps, wherein executing a k-limited local crawl of the previous status of the screen comprises executing a backtrack to a previous status of the screen of the original test script;

the k-limited local crawl having a maximum depth corresponding to a number of statuses of the screen to access and comprising a heuristic-guided search to search for a missing element to generate a repair sequence for the element causing one of the failures;

creating, using the processor, metrics to weight a plurality of alternate elements to the element causing one of the failures, wherein the metrics are determined based on characteristics selected from the group consisting of: term overlap, synonyms, image similarity, image-label association, and prior success;

modifying, using the processor, the original test script to overcome the identified failures for the different execution environment;

creating, using the processor, a repair model upon successfully modifying the original test script;

storing, on a computer readable storage medium, the test script step and corresponding status of the screen of each step utilized in creating the repair model; and testing, using the processor, additional variants of the application utilizing the repair model.

\* \* \* \* \*